(12) United States Patent
Ishiguro et al.

(10) Patent No.: US 9,206,488 B2
(45) Date of Patent: Dec. 8, 2015

(54) HOT PRESS FORMING APPARATUS AND HOT PRESS FORMING METHOD

(75) Inventors: Katsunori Ishiguro, Toyota (JP); Masaki Furuhashi, Toyota (JP)

(73) Assignee: AISIN TAKAOKA CO., LTD., Toyota-Shi, Aichi (JP)

( * ) Notice: Subject to any disclaimer, the term of this patent is extended or adjusted under 35 U.S.C. 154(b) by 1179 days.

(21) Appl. No.: 12/808,054

(22) PCT Filed: Sep. 26, 2008

(86) PCT No.: PCT/JP2008/067473
§ 371 (c)(1),
(2), (4) Date: Jun. 14, 2010

(87) PCT Pub. No.: WO2009/075132
PCT Pub. Date: Jun. 18, 2009

(65) Prior Publication Data
US 2010/0288009 A1    Nov. 18, 2010

(30) Foreign Application Priority Data
Dec. 13, 2007    (JP) .................................. 2007-322505

(51) Int. Cl.
*C21D 1/673*    (2006.01)
*B21D 22/02*    (2006.01)
(Continued)

(52) U.S. Cl.
CPC .............. *C21D 1/673* (2013.01); *B21D 22/022* (2013.01); *B21D 43/04* (2013.01); *C21D 1/34* (2013.01); *C21D 1/42* (2013.01); *C21D 1/667* (2013.01); *C21D 9/48* (2013.01); *F27D 11/04* (2013.01)

(58) Field of Classification Search
CPC .... B21D 22/022; B21D 22/208; B21D 37/16; C21D 1/62; C21D 1/673

USPC ............ 72/419, 420, 421, 342.1, 342.6, 34.6, 72/342.2, 342.3, 342.4, 342.5, 405, 404; 148/637, 644, 647, 654, 658, 660, 661, 148/664; 700/7, 45, 230, 245
See application file for complete search history.

(56) References Cited

U.S. PATENT DOCUMENTS 2,680,179 A * 6/1954 Mase .............................. 219/152
4,309,887 A * 1/1982 Judd ............................... 72/280
(Continued)

FOREIGN PATENT DOCUMENTS

CN    1611310 A    5/2005
JP    61-127832 U    8/1986
(Continued)

OTHER PUBLICATIONS

Official Action dated Jan. 5, 2011, issued by the Japanese Patent Office in corresponding Japanese patent application No. 2007-322505, and English translation of the Official Action.
(Continued)

*Primary Examiner* — Shelley Self
*Assistant Examiner* — Pradeep C Battula
(74) *Attorney, Agent, or Firm* — Buchanan Ingersoll & Rooney PC

(57) ABSTRACT

A hot press forming apparatus that hot press forms a blank to process the blank into a formed product includes: a conduction heating mechanism installed in the hot press forming apparatus, the conduction heating mechanism clamping the fed blank at a predetermined conducting position so as to be in a conveyance-stopped state, and performs conduction heating onto the blank; a die quenching type hot press mechanism installed in the hot press forming apparatus and disposed thermally isolated downstream of the conduction heating mechanism, the hot press mechanism hot pressing the blank subjected to conduction heating at a predetermined processing position; and a conveying mechanism installed in the hot press forming apparatus. The conveying mechanism conveys the blank subjected to conduction heating at least from the conducting position to the processing position, to supply the blank to the hot press mechanism.

9 Claims, 6 Drawing Sheets

Figure 2:
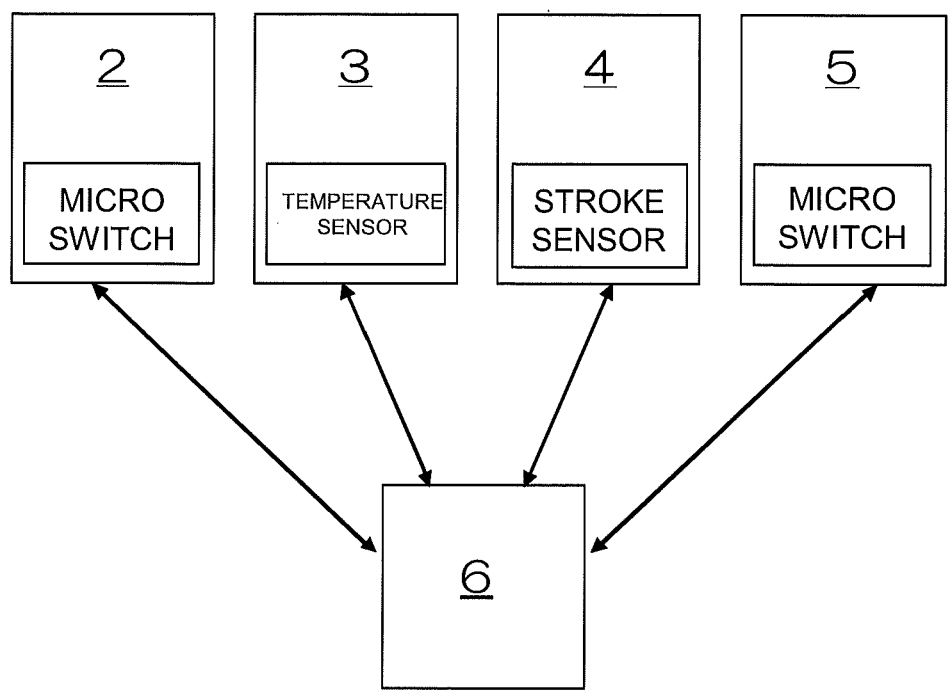

(51) Int. Cl.
*C21D 1/34* (2006.01)
*C21D 1/667* (2006.01)
*C21D 9/48* (2006.01)
*C21D 1/42* (2006.01)
*F27D 11/04* (2006.01)
*B21D 43/04* (2006.01)

(56) References Cited

U.S. PATENT DOCUMENTS

| | | | |
|---|---|---|---|
| 4,394,194 A * | 7/1983 | Satava et al. | 148/575 |
| 4,513,602 A * | 4/1985 | Sofy | 72/405.13 |
| 4,557,134 A * | 12/1985 | Kuppinger | 72/405.05 |
| 4,643,634 A * | 2/1987 | Duina | 198/750.12 |
| 4,785,657 A * | 11/1988 | Votava | 72/405.14 |
| 5,553,297 A * | 9/1996 | Yonezawa et al. | 700/18 |
| 5,562,197 A * | 10/1996 | Vaphiadis | 198/776 |
| 6,003,359 A * | 12/1999 | Futamura et al. | 72/404 |
| 6,185,978 B1 * | 2/2001 | Sundgren et al. | 72/364 |
| 6,564,604 B2 * | 5/2003 | Kefferstein et al. | 72/47 |
| 7,004,004 B2 * | 2/2006 | Arns et al. | 72/342.1 |
| 7,165,435 B1 * | 1/2007 | Schroth et al. | 72/364 |
| 7,199,334 B2 * | 4/2007 | Friedman et al. | 219/385 |
| 7,269,986 B2 * | 9/2007 | Pfaffmann et al. | 72/60 |
| 7,284,402 B2 * | 10/2007 | Friedman et al. | 72/60 |
| 7,867,344 B2 * | 1/2011 | Kusumi et al. | 148/635 |
| 7,984,635 B2 * | 7/2011 | Callebaut et al. | 72/342.1 |
| 8,127,449 B2 * | 3/2012 | Bayer et al. | 29/897.2 |
| 2002/0100303 A1 * | 8/2002 | Klein | 72/38 |
| 2006/0060268 A1 * | 3/2006 | Machrowicz et al. | 148/575 |
| 2006/0112753 A1 | 6/2006 | Friedman et al. | |
| 2006/0237420 A1 | 10/2006 | Friedman et al. | |
| 2009/0320968 A1 | 12/2009 | Boeke et al. | |

FOREIGN PATENT DOCUMENTS

| | | |
|---|---|---|
| JP | 9-10868 A | 1/1997 |
| JP | 2001-314923 A | 11/2001 |
| JP | 2002-18531 A | 1/2002 |
| JP | 2004-106035 A | 4/2004 |
| JP | 2005059010 A | 3/2005 |
| JP | 2005-199300 A | 7/2005 |
| JP | 2005199300 A | 7/2005 |
| JP | 2005262235 A | 9/2005 |
| JP | 2006-130513 A | 5/2006 |
| JP | 2006-289425 A | 10/2006 |
| JP | 2007136533 A | 6/2007 |
| JP | 2008087001 A | 4/2008 |

OTHER PUBLICATIONS

International Search Report (PCT/ISA/210) issued on Dec. 2, 2008 by the Japanese Patent Office in its capacity as the International Search Authority in International Application No. PCT/JP2008/067473.

Written Opinion (PCT/ISA/237) issued on Dec. 2, 2008 by the Japanese Patent Office in its capacity as International Search Authority in International Application No. PCT/JP2008/067473.

Japanese Office Action dated Jun. 5, 2012, issued in corresponding Japanese Patent Application No. 2007-322505. (2 pages).

English Translation of the International Preliminary Report on Patentability (IPRP) (Forms PCT/IB/338 and PCT/IB/373) and Written Opinion of the International Searching Authority and International Preliminary Report on Patentability (Form PCT/ISA/237) issued in corresponding International Application No. PCT/JP2008/067473 dated Aug. 10, 2010.

Official Action issued on Aug. 19, 2011 by the Japanese Patent Office in corresponding Japanese Patent Application No. 2007-322505, and English language translation of the Official Action.

Second Official Action dated Feb. 5, 2013 issued by the Chinese Patent Office in corresponding Chinese Application No. 200880120717.2.

Supplementary European Search Report dated Jun. 14, 2013 issued in corresponding European Application No. 08 86 0447.

Supplementary European Search Report dated Jul. 15, 2013 issued in corresponding European Application No. 08 86 0447.

* cited by examiner

FIG. 1B
FIG. 1A
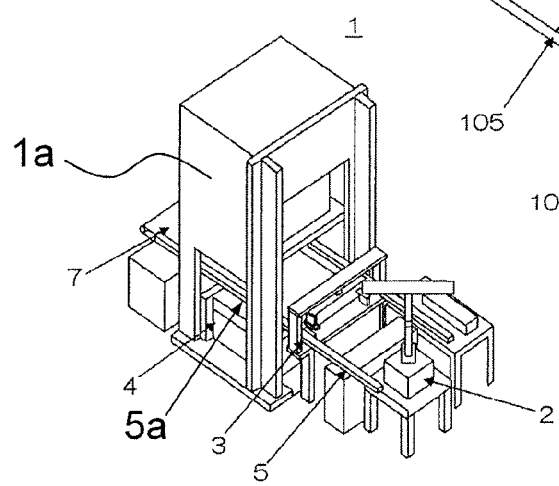
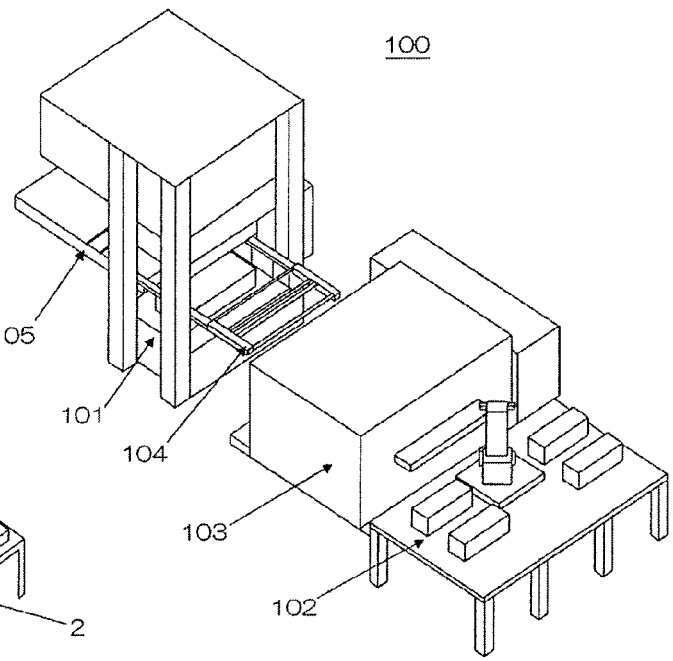

FIG. 3A
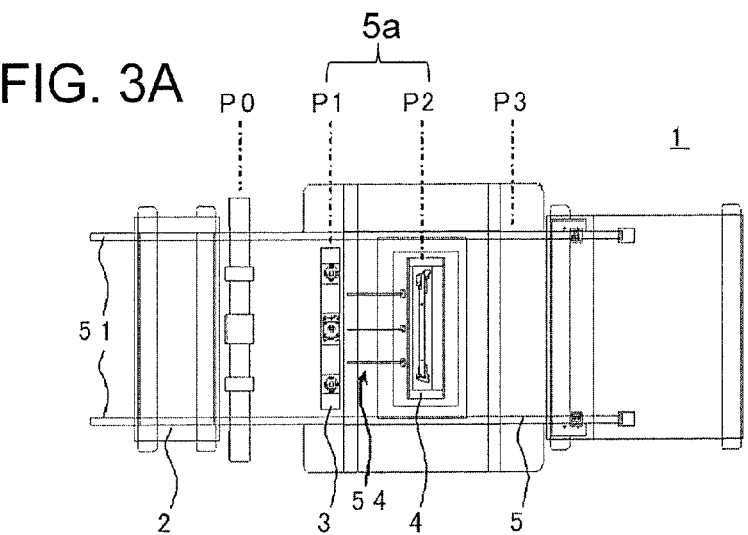
FIG. 3B
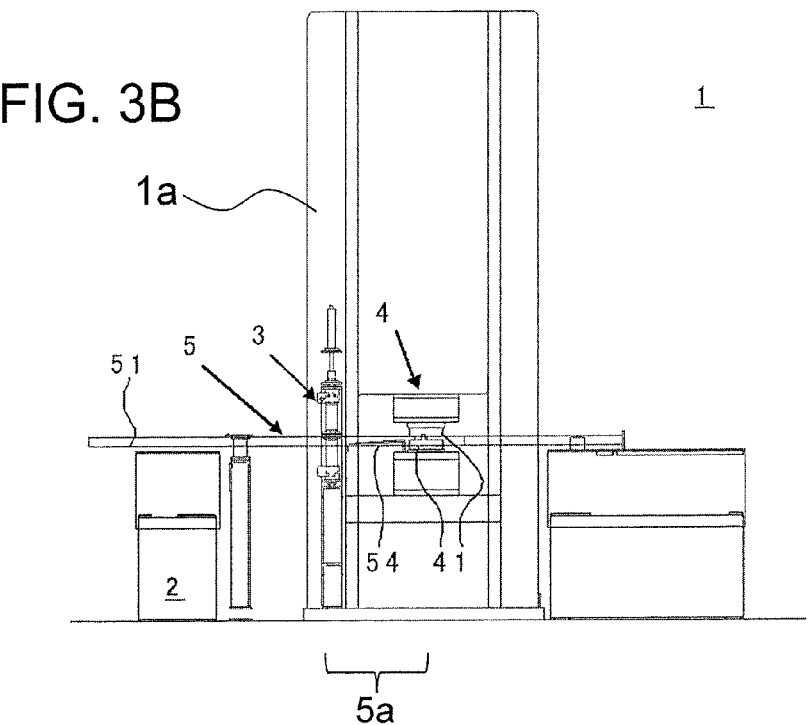
FIG. 3C

HOT PRESS FORMING APPARATUS AND HOT PRESS FORMING METHOD

CROSS-REFERENCE TO RELATED APPLICATION

The present invention is based on and claims the benefit of the priority of Japanese Patent Application No. 2007-322505 (filed on Dec. 13, 2007), and the disclosure of which is incorporated herein in its entirety by reference thereto.

TECHNICAL FIELD

The present invention relates to a hot press forming apparatus and a hot press forming method, and in particular, to a hot press forming apparatus and a hot press forming method for die quenching.

BACKGROUND

As one of the methods of mass-producing vehicle parts requiring high-strength, a hot press forming technique or a die quenching technique is employed. The die quenching technique is a technique in which a steel plate is heated to about 900° C., and the steel plate is thereafter rapidly cooled simultaneously with press forming, to quench a formed product. Further, for the heating of a steel plate, conventionally, a continuous heating furnace installed separately from the press forming apparatus is generally used.

As such a heating furnace, a hot press forming system disclosed in Patent Document 1 employs a radiation heating machine separately installed in the preceding stage of its hot press forming apparatus. In a hot press forming apparatus disclosed in Patent Document 2, such a heating furnace is separately installed in the preceding stage of the hot press forming apparatus, and heated blanks are robotically conveyed between its heating furnace and the hot press forming apparatus.

Further, additionally, in Patent Document 3, there is disclosed a hot press forming method for metal plate comprising the successive steps of "respectively attaching electrodes to one or more places of the both ends of a metal plate inside a metal die or in the vicinity of the die outside the metal die, applying an electric current between the electrodes to heat the metal plate to a predetermined working temperature by Joule heat, and performing hot press forming".

In Patent Document 4, there is disclosed a carrier apparatus for plate material for press in which "heating means for heating a portion corresponding to a formed portion of the plate material for press is provided to a conveyor hand that conveys a plate material for press to a press die for press working".

Patent Document 1: Japanese Patent Kokai Publication No. JP-P2006-289425A
Patent Document 2: Japanese Patent Kokai Publication No. JP-P2006-130513A
Patent Document 3: Japanese Patent Kokai Publication No. JP-P2002-18531A
Patent Document 4: Japanese Utility Model Kokai Publication No. JP-U-61-127832

SUMMARY

The disclosures in Patent Documents 1 to 4 described above are herein incorporated by reference thereto. The analysis set forth below is given by the present invention.
In the case where a steel plate is heated by a continuous heating furnace installed separately from a press forming apparatus in the conventional die quenching technique or the invention in Patent Document 1 or 2 described above, there is a problem relating to its productivity and an installation area for the forming system. The reason for the problem is that, in contrast to that it takes a time of at least about 3 to 5 minutes in order to raise a temperature of a steel plate at room temperature to about 900° C. as described above by a heating furnace, and on the other hand, a time required for a pressing step or a pressing cycle is about 30 seconds at most, which makes it necessary to have many stock blanks, i.e., ten or more blanks in heating in the heating furnace in order not to keep the press apparatus waiting, and accordingly, the volume of the heating furnace is increased, that increases an installation area for the forming system.

According to the invention of Patent Document 3, since conduction heating onto blanks is performed in a metal die or in the vicinity of the metal die, a waiting time for the entire process is specified on the basis of a sum of the time required for heating and pressing. Thereby, according to the invention of Patent Document 3, bringing about a problem that a time required for completing one formed product is further increased, and its productivity is reduced. In addition, according to the invention of Patent Document 3, since conduction heating is performed in a metal die or in the vicinity of the metal die, a problem that a structure for securing electrical insulation or thermal insulation between its electrodes and the metal die is needed, which makes the apparatus get more complex or become more enlarged, is brought about.

According to a device of Patent Document 4, since blanks are heated in the step of conveyance, a problem that a structure for securing electrical insulation or thermal insulation between its electrodes for heating and its conveying mechanism is needed, which makes the apparatus get more complex, and it is difficult to sufficiently heat blanks depending on a size of a blank, is brought about.

It is an object of the present invention to provide a hot press forming apparatus and a hot press forming method which are capable of shortening a time required from the start of heating a blank to the termination of forming, that is suitable for die quenching, and a hot press forming apparatus which can be downsized and a hot press forming method suitably executed in the downsized hot press forming apparatus.

According to a first aspect of the present invention, there is provided a hot press forming apparatus that hot press-forms a blank into a formed product. The apparatus comprises a conduction heating mechanism which is installed in the hot press forming apparatus and clamps the fed blank in a conveyance-stopped state at a predetermined energizing position (i.e., conducting position) to perform conduction heating onto the blank; a die quenching hot press mechanism which is installed in the hot press forming apparatus and disposed so as to be thermally isolated downstream of the conduction heating mechanism wherein the hot press mechanism hot presses the conduction heated blank at a predetermined processing position; and a conveying mechanism which is installed in the hot press forming apparatus, wherein the conveying mechanism conveys the conduction heated blank at least from the energizing position to the processing position to supply the blank to the hot press mechanism.

According to a second aspect of the present invention, there is provided a hot press forming method that hot press-forms a blank into a formed product. The method comprises an energizing and processing step that clamps a blank at an energizing position in a conveyance-stopped state to perform conduction heating onto the blank; and hot presses an other previously conduction heated blank at a processing position on the downstream side thermally isolated from the energizing position in synchronization with the heating of the blank; and a conveying step that rapidly conveys the conduction heated blank from the energizing position to the processing position, and conveys the formed product from the processing position to a discharging position at which the formed product is discharged from the processing position in synchronization with the rapid conveying of the conduction heated blank.

The advantageous effects of the present invention will be exemplified below.

(1) Since thermal conduction from a blank in the step of conduction heating or conveying to a hot press mechanism, especially a die, that is desired to be always intensively cooled and kept at a sufficiently-low temperature for execution of die quenching is prevented as much as possible, it is possible to immediately carry out a processing cycle including hot press forming and rapid quenching, i.e., a die quenching cycle onto the conduction heated blank which has been conveyed to the processing position. Thereby, the formed product is cooled at a sufficiently high speed to be quench-hardened during the hot press forming or after forming.

(2) Since a conduction heating mechanism and a die quenching hot press mechanism are disposed so as to be thermally isolated from each other, and rapid conveying of a blank is performed by use of a conveying mechanism between the both mechanisms, it is possible to prevent harmful effects which the conduction heating step and the hot pressing step exert on each other. For example, an effect that conduction heating exerts on components of the hot press mechanism is prevented, and for example, heating of the die due to conduction heating is prevented, which offers an expectation of improving the rapid quenching effect by the die, i.e., hardenability by die quenching during the hot pressing. Further, it is easy to secure the insulation between the conduction heating mechanism and the hot press mechanism.

(3) Since conduction heating and hot pressing can be independently and synchronously performed, as a result, it is possible to shorten a time required from the start of heating a blank to the termination of forming the blank. Further, since it is possible to shorten a heating time, oxidization of a blank due to heating is prevented or restrained. Thereby, a subsequent step for eliminating an oxidized portion of the formed product can be made unnecessary, or laborsaving thereof is possible.

(4) Since the conduction heating mechanism is built into the hot press forming apparatus to integrate the conduction heating mechanism and the hot press mechanism, the entire system required for hot press forming can be downsized, and an installation area for the entire system is decreased to achieve space-saving.

(5) Since the conduction heating mechanism is installed independently from the conveying mechanism, it is possible to reduce an effect that conduction heating exerts on the conveying mechanism. For example, it is easy to secure insulation between the conduction heating mechanism and the conveying mechanism, which prevents a thermal effect which conduction heating exerts on components of the conveying mechanism.

(6) Since the conduction heating mechanism is installed independently from the hot press mechanism and the conveying mechanism, it is easy to support a blank which may be deformed by heating.

(7) Since feeding of a blank, conveying of the blank to the energizing position, conveying of the blank to the processing position, and conveying of a formed product to the discharging position can be performed in synchronization with each other, a time required for one cycle is shortened, which prevents or restrains oxidization of the formed product.

BRIEF DESCRIPTIONS OF THE DRAWINGS

Figure 4:
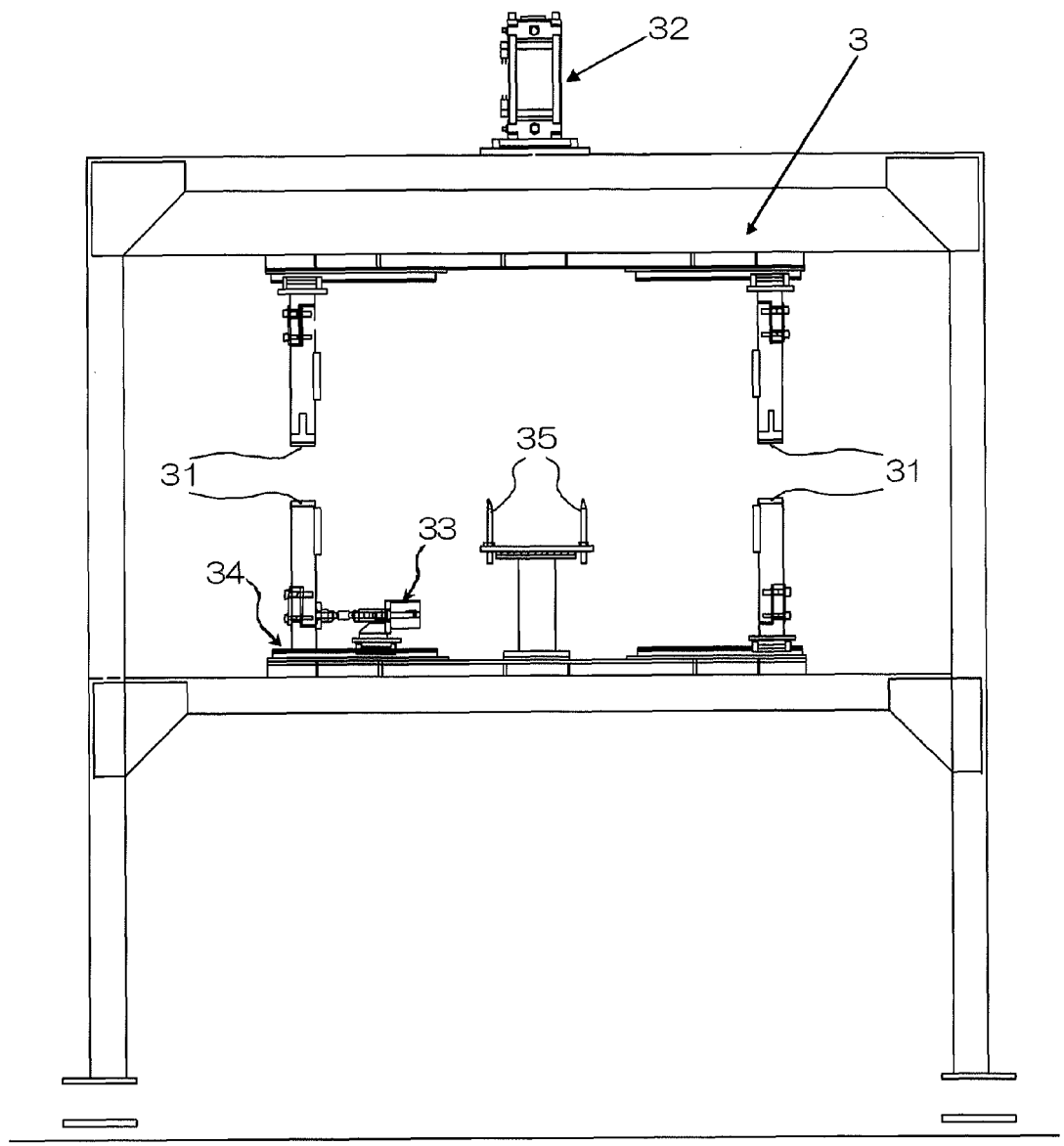
Figure 5:
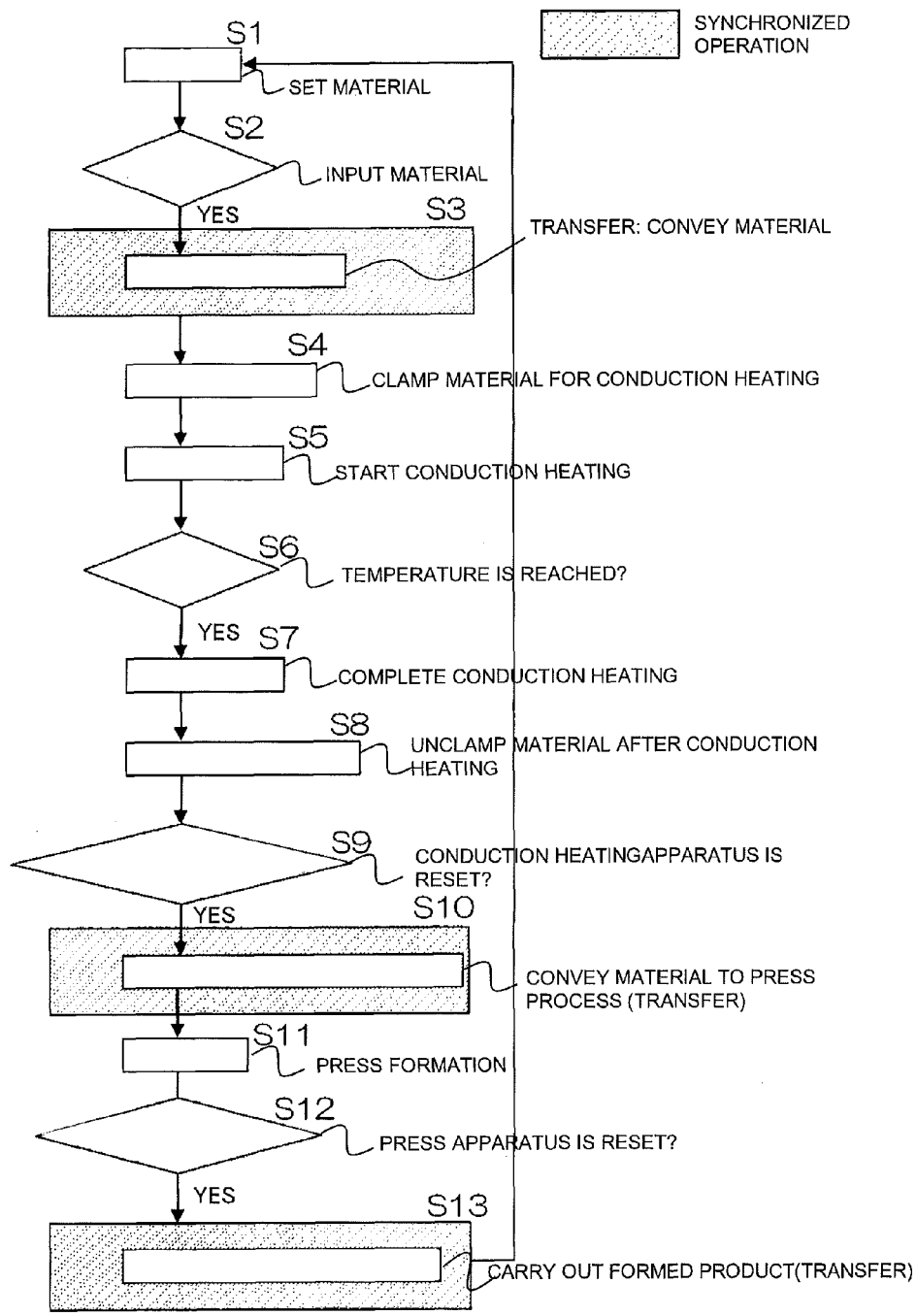
Figure 6:
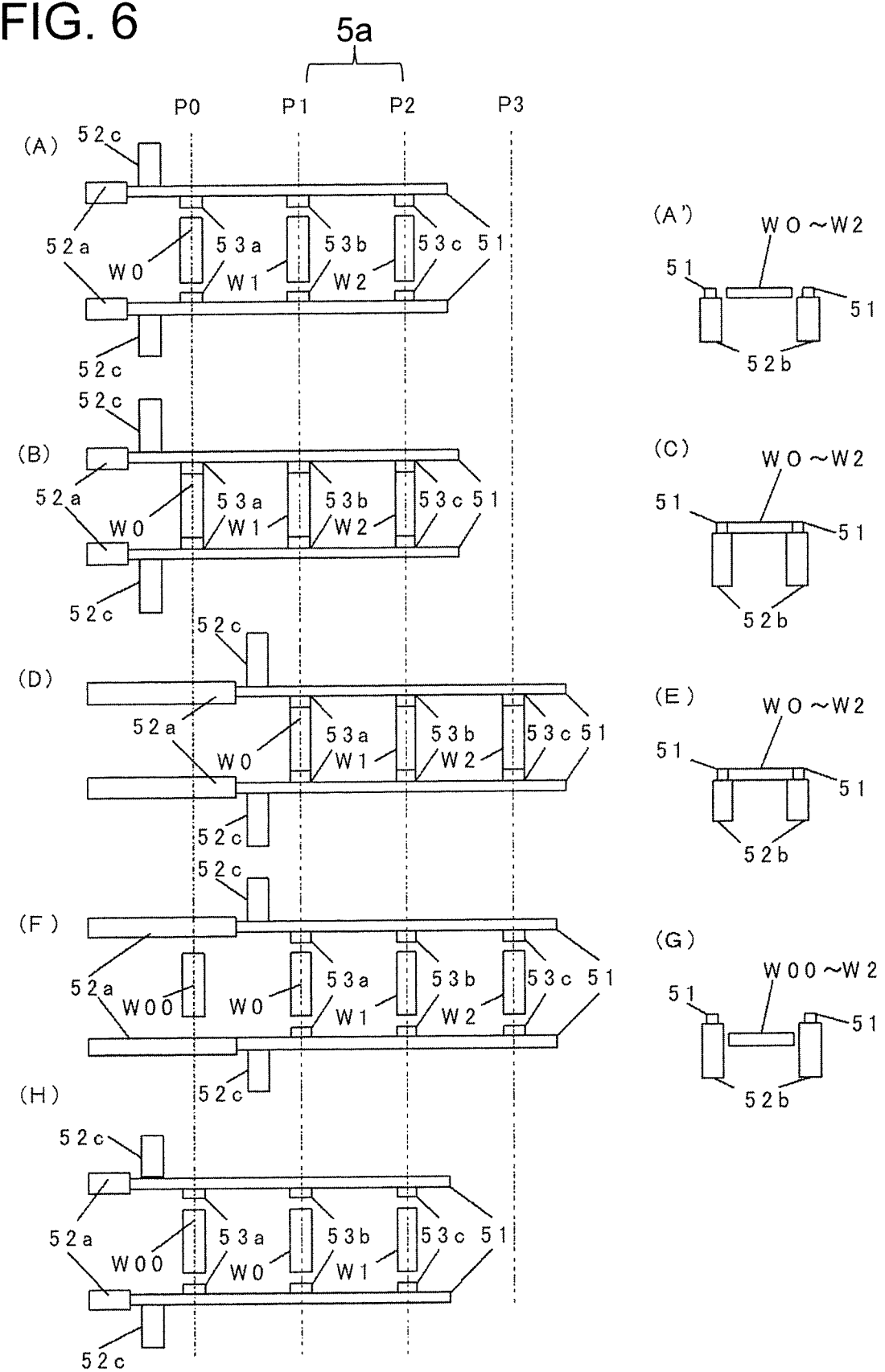

FIG. 1A is an appearance view of a hot press forming apparatus according to an example of the present invention.
FIG. 1B is an appearance view of a hot press forming system according to a comparative example.
FIG. 2 is a block diagram for explanation of a configuration of the hot press forming apparatus shown in FIG. 1A.
FIGS. 3A to 3C are drawings of three planes for explanation of the hot press forming apparatus shown in FIG. 1A. FIG. 3A is a top plan view, FIG. 3B is a front view and FIG. 3C is a side view, respectively.
FIG. 4 is an enlarged view of FIG. 3C.
FIG. 5 is a flowchart for explanation of an outline of steps of conveying, heating, and forming by the hot press forming apparatus according to an example of the present invention.
(A) to (H) of FIG. 6 are process drawings for explanation of an outline of steps of conveying, heating, and forming by the hot press forming apparatus according to an example of the present invention.

As for explanation of signs, refer to the end of the description.

PREFERRED MODES

A hot press forming apparatus according to a preferred exemplary embodiment of the present invention has a control mechanism that executes a cycle of successive steps including a heating step by the conduction heating mechanism, a processing step by a hot press mechanism, and a conveying step by the conveying mechanism in accordance with a predetermined sequence. A time required for carrying out a successive cycle including a heating step and a hot pressing step of the blank is shortened. It is preferable that the predetermined sequence is set such that the control mechanism executes at least the heating step by the conduction heating mechanism and the processing step by the hot press mechanism in synchronization with each other, and it is more preferable that the predetermined sequence is set such that all the carrying steps are synchronously or simultaneously carried out.

The hot press forming apparatus according to a preferred exemplary embodiment of the present invention has a feeding mechanism that supplies a blank to the hot press forming apparatus or the conduction heating mechanism. In this case, it is preferable that the control mechanism can synchronize, not only the operations of the conduction heating mechanism, the hot press mechanism, and the conveying mechanism, but also an operation of the blank feeding mechanism. Note that it is also possible to directly feed a blank into the conduction heating mechanism, and in this case, the feeding position and the energizing position are matched to one another. It is also possible for the conveying mechanism of the present invention to serve as the feeding mechanism as well, or the feeding mechanism may be separately provided. For example, a transfer mechanism or a robotic mechanism may be used as the feeding mechanism.

The hot press forming apparatus according to a preferred exemplary embodiment of the present invention comprises a taking-out (discharging) mechanism that carries out a formed product from the hot press forming apparatus or the hot press mechanism. In this case, it is preferable that the control mechanism synchronizes, not only the operations of the conduction heating mechanism, the hot press mechanism, and the conveying mechanism, but also the operation of the taking-out mechanism. Note that it is also possible to directly take out a formed product from the hot press mechanism, and in this case, the processing position and the discharging position are matched to one another. It is also possible for the conveying mechanism of the present invention to serve as the taking-out mechanism as well, or the taking-out mechanism may be separately provided according to the circumstances. For example, a transfer mechanism or a robotic mechanism may be used as the taking-out mechanism.

The present invention is suitably applied to a hot press forming apparatus in which a blank is cut by a hot press mechanism or another cutting mechanism at a processing position. In the case of this exemplary embodiment, holding mechanisms or holding members of a conveying mechanism may be elongated and contracted to be capable of holding a formed product cut to be shorter than the blank, or a formed and cut product may be taken-out by an taking-out mechanism separately installed.

In a preferred exemplary embodiment of the present invention, it is preferable that the conveying mechanism has a holding mechanism free to hold the blank synchronously at least at the energizing position and the processing position. It is more preferable that the conveying mechanism has a holding mechanism free to hold the blank at a feeding position at which the blank is fed into the hot press forming apparatus or the conduction heating mechanism, and free to hold the formed product at a discharging position at which the formed product is discharged from the hot press forming apparatus. According to this aspect, since it is easy to synchronize the conveyance of a plurality of blanks and/or formed products, a time required for carrying out a successive cycle including steps of feeding, heating, and hot pressing of a blank, and a discharging step of a formed product is shortened.

In a preferred exemplary embodiment of the present invention, the holding mechanism has a plurality of holding members that respectively reciprocate so as to be synchronized with each other between the energizing position and the processing position, the feeding position and the energizing position, and/or the processing position and the discharging position, and hold or release the blank and/or the formed product. According to this aspect, the conveying mechanism is simplified as a whole and the conveyance of blanks and/or formed products can be performed efficiently, which shortens a time required for carrying out a successive cycle including feeding, heating, and hot pressing of a blank, and discharging a formed product.

In a preferred exemplary embodiment of the present invention, the conveying mechanism has a pair of parallel arms extending along a conveying direction of the blank, driving mechanism for driving the pair of parallel arms to be free to move in a reciprocating manner along the conveying direction, a lifting up/down (vertical) direction perpendicular to the conveying direction, and a width direction perpendicular to the conveying direction and lifting up/down directions, and a plurality of holding members which are attached to the pair of parallel arms at predetermined intervals along the conveying direction, the plurality of holding members hold the blank and/or the formed product when the pair of parallel arms approaches each other along the width direction, and release the holding when the pair of parallel arms is separated from each other. According to this aspect, the conveying mechanism for blanks and/or formed products is downsized and the conveyance thereof are made efficient, which shortens a time required for carrying out a successive cycle composed of a conveyance, heating and hot pressing of a blank.

In a preferred exemplary embodiment of the present invention, the hot press mechanism has a cooling die for hot pressing and rapid quenching the blank. According to the present invention, since the conduction heating mechanism and the hot press mechanism are disposed so as to be thermally isolated, it is possible to perform sufficient rapid quenching simultaneously with hot pressing by the die or the cooling die of the hot press mechanism, which makes it possible to sufficiently quench a formed product. It is preferable that the conduction heating mechanism and the hot press mechanism are disposed so as to be isolated (remote) from each other such that the hot press mechanism performs die quenching to obtain a rapidly-quenched formed product. Note that it is preferable that the hot press mechanism has a die forcibly cooled, or occasionally naturally cooled, i.e., a cooling die whose temperature can be kept at which it is possible to perform die quenching. The hot press mechanism may have a channel which is formed in the die through which a fluid (water, oil, or air) circulates and a pump for circulating the fluid (water, oil, or air) through the channel.

In a preferred exemplary embodiment of the present invention, in the conveying step, a step of further feeding a new blank at the energizing position is carried out in synchronization with a step of conveying the conduction heated blank from the energizing position to the processing position and a step of conveying the formed product from the processing position to a discharging position at which the formed product is discharged. According to this aspect, since it is possible to simultaneously carry out a step of supplying the blank to the apparatus, a step of conveying the conduction heated blank inside the apparatus, and a step of discharging the formed product out of the apparatus, it is possible to simplify the conveying steps and the conveying mechanism.

In a preferred exemplary embodiment of the present invention, the hot pressing is die quenching that performs rapid quenching during hot pressing.

In a preferred exemplary embodiment of the present invention, since the conduction heated blank is rapidly conveyed within 10 seconds, preferably within 5 seconds or several seconds, from the energizing position to the processing position, which prevents or restrains temperature drop and oxidation of the blank.

In a preferred exemplary embodiment of the present invention, it suffices to perform conduction heating to heat the blank to a temperature to be possible for hot pressing. For example, in the case of steel blanks, it suffices to perform conduction heating between an A1 transformation temperature and a liquid-phase precipitation temperature, for example, ranging from 850 to 1,200° C. Further, provided that a temperature of the die of the hot press mechanism is set to a temperature ranging from a room temperature to about 250° C., it is possible to cool a blank heated to the A1 temperature or more to a temperature of about 220° C. or less at a speed of 20° C./second or more, which gives a sufficient quench-hardening.

The present invention is suitably applied to forming of blanks of various materials which can be subjected to conduction heating and hot processing, and in particular, to die quenching. For example, the present invention is applied to forming of steel system, aluminum system, and other various metal materials. The present invention is suitably applied to forming of not only general steel plates, but also plated steel plates (for example, zinc-galvanized steel plates, alloying hot dip zinc-galvanized steel plates, aluminum plated steel plates, and the like). The present invention is suitably applied to a hot press forming apparatus having one hot press mechanism, or a hot press forming method for performing one-time hot pressing.

EXAMPLES

Hereinafter, an example of the present invention will be described with reference to the accompanying drawings. FIG.

1A is an appearance diagram of a hot press forming apparatus according to an example of the present invention, and FIG. 1B is an appearance diagram of a hot press forming system according to a comparative example.

Referring to FIG. 1A, in a hot press forming apparatus 1 according to an example of the present invention, a conduction heating mechanism 3 to which blanks are supplied one by one from a feeding mechanism 2, a die quenching hot press mechanism 4 disposed so as to be thermally isolated on the downstream side of the conduction heating mechanism 3, and a transfer mechanism 5 serving as a conveying mechanism that at least conveys a conduction heated blank from the conduction heating mechanism 3 to the hot press mechanism 4 and conveys a formed product from the hot press mechanism 4 toward an discharging position are built into the apparatus 1. Note that a conveying conveyor 7 for discharging a formed product or a completed article from the discharging position of the apparatus 1 is additionally installed in the hot press forming apparatus 1.

On the other hand, referring to FIG. 1B, a hot press forming system 100 according to the comparative example is made up of a hot press forming apparatus 101, a continuous heating furnace 103 which is disposed outside the hot press forming apparatus 101, and to which blanks are supplied from a feeding mechanism 102, the continuous heating furnace 103 simultaneously heats a plurality of blanks, a loading apparatus 104 that conveys a heated blank from the continuous heating furnace 103 to the hot press forming apparatus 101, and an unloading apparatus 105 that conveys a formed product from the hot press forming apparatus 101 toward a discharging position.

By contrasting FIG. 1A to FIG. 1B, it is clear that the hot press forming apparatus 1 according to an example of the present invention has an area required for installation thereof which is half or less than that of the hot press forming system 100 according to the comparative example using the continuous heating furnace 103. Further, according to the hot press forming apparatus 1 of the present example, a heating time by energization, a conveying time from an energizing position to a processing position, and the like are all several seconds, and a time required from the start of conduction heating to the termination of forming is several seconds to several tens of seconds in total. In contrast thereto, according to the system 100 of the comparative example, since it takes several minutes for radiation heating in the heating furnace, it takes about a couple of (2 or 3) minutes from the start of heating to the termination of forming in total. That is, by use of the hot press forming apparatus 1 of the present example, it is expected to improve productivity or mass productivity at least double or more, and oxidation of blanks is prevented or restrained.

FIG. 2 is a block diagram for explanation of a configuration of the hot press forming apparatus shown in FIG. 1A. Referring to FIG. 2, the hot press forming apparatus 1 is composed by including a feeding mechanism 2, a conduction heating mechanism 3, a hot press mechanism 4, a transfer mechanism 5, and a control mechanism 6 for making these mechanisms 2 to 5 operate synchronously.

The blank feeding mechanism 2 is a robotic mechanism, that takes out the blanks one by one from a magazine in which a plurality of blanks are contained, to supply those one by one to a feeding position for blanks in the conduction heating mechanism 3 or the hot press forming apparatus 1 in accordance with a command from the control mechanism 6.

The conduction heating mechanism 3 performs clamping of a fed blank and release thereof and performs energization to heat the clamped and conveyance-stopped blank in accordance with a command from the control mechanism 6.

The hot press mechanism 4 hot presses and rapidly-cools a heated blank in accordance with a command from the control mechanism 6, thereby forming a formed product from the blank, basically, by one-time hot pressing.

The conveying mechanism 5 has a plurality of holding mechanisms or holding members that hold blanks or formed products or release the holdings thereof at a feeding position at which a blank is fed into the hot press forming apparatus 1 or the conduction heating mechanism 3, an energizing position at which the conduction heating mechanism 3 energizes the blank, a processing position at which the hot press mechanism 4 hot presses the blank, and a discharging position at which a formed product is discharged from the hot press forming apparatus 1, and respectively reciprocate between the feeding position and the energizing position, the energizing position and the processing position, and the processing position and the discharging position in accordance with a command from the control mechanism 6 (refer to clamps 53a to 53c in FIG. 6).

The control mechanism 6 has a microcomputer that receives information output from various types of sensors provided in the mechanisms 2 to 5, for example, a stroke sensor monitoring strokes of the die of the hot press mechanism 4, a micro switch detecting states of the feeding mechanism 2 and the conveying mechanism 5 or driving means thereof such as air cylinders, a temperature sensor detecting a temperature of a blank heated by the conduction heating mechanism 3, and the like, and outputs a control signal in order to control the mechanisms 2 to 5 to operate synchronously on the basis of those information.

FIGS. 3A to 3C are diagrams of three planes for explanation of the hot press forming apparatus shown in FIG. 1A. FIG. 3A is a top plan view thereof, FIG. 3B is a front view thereof, and FIG. 3C is a side view thereof. FIG. 4 is an enlarged view of FIG. 3C.

Referring to FIGS. 3A to 3C and FIG. 4, in the hot press forming apparatus 1, a feeding position P0 at which a blank is fed, an energizing position P1 at which conduction heating by the conduction heating mechanism 3 is performed, a processing position P2 at which hot pressing or die quenching by the hot press mechanism 4 is performed, and a discharging position P3 at which a formed product is discharged from the hot press forming apparatus 1 are set at regular pitches in the order from the upstream side toward the downstream side along a conveying direction.

The conduction heating mechanism 3 has a plurality of electrodes 31 that clamp a blank at the energizing position P1 to energize the blank, an electrode lifting up/down cylinder 32 that lifts up/down the plurality of electrodes 31 to clamp a blank or release the clamping, a movable clamping cylinder 33 that drives a pair of the electrodes 31 vertically facing each other to freely move along a longitudinal direction of a blank, a translatory guide 34 that guides a pair of the electrodes 31 moving, and support rods 35 which are disposed immediately beneath the energizing position P1, that are free to support the central portion of a blank, to prevent the central portion of the blank from drooping due to conduction heating as much as possible. It is preferable that a clamping position by a pair of upper and lower electrodes (31, 31) on one side among the pairs of upper and lower electrodes (31, 31) and (31, 31) laterally facing each other is fixed, and the other pair of upper and lower electrodes (31, 31) on the other side is made movable along a longitudinal direction of a blank. During conduction heating, the pair of upper and lower electrodes (31, 31) on the one side holds one side of a blank at the fixed position, and the other pair of upper and lower electrodes (31, 31) on the other side moves along a longitudinal direction of the blank while holding the other side of the blank according to the thermal deformation of the blank, to apply appropriate tension to the blank, which makes it possible to prevent distortion of the blank as much as possible.

The hot press mechanism 4 has a cooling die 41 for performing hot pressing to rapidly cool a conduction heated blank at the processing position P2.

The conveying mechanism 5 has a pair of parallel arms 51 extending along a conveying direction of the blank, cylinders 52a to 52c (refer to (A) and (A') of FIG. 6) serving as driving means that drive the pair of parallel arms 51 to freely move in a reciprocating manner along the conveying direction, a lifting up/down direction perpendicular to the conveying direction, and a width direction perpendicular to the conveying and lifting up/down directions, and a plurality of clamps 53a to 53c (refer to FIG. 6) serving as holding mechanisms or holding members which are attached (plurally) to the pair of parallel arms 51 at predetermined intervals along the conveying direction, and hold a blank or a formed product when the pair of parallel arms 51 approaches each other along the width direction, and release the holding when the pair of parallel arms 51 is separated from each other. The plurality of clamps 53a to 53c are disposed at regular pitches on the pair of parallel arms 51 so as to correspond to the distances between the feeding position P0, the energizing position P1, the processing position P2, and the discharging position P3. As the plurality of clamps 53a to 53c, various holding members such as claws pinching a blank, holding members driven by air cylinders, chucks, or suction disks may be employed. Note that a servo motor or the like may be employed as driving means in place of the cylinders 52a to 52c serving as driving means.

Moreover, the conveying mechanism 5 has a support rod 54 that supports and/or guides a blank thermally deformed such that its central portion droops due to conduction heating between the energizing position P1 and the processing position P2. The support rod 54 is inclined so as to be higher toward the downstream side in the conveying direction such that the side of the processing position P2 is made higher than the side of the energizing position P1. The inclined angle of the support rod 54 is set in accordance with a material of blanks, a heating temperature, and a stroke width in the lifting up/down direction of the conveying mechanism 5.

The outline of steps of conveying, heating, and forming by the hot press forming apparatus according to an example of the present invention described above will be described. FIG. 5 is a flowchart for explanation of an outline of steps of conveying, heating, and forming by the hot press forming apparatus according to an example of the present invention.

Referring to FIGS. 3A to 3C and FIG. 5, an initial blank (material) is set at the feeding position P0 by the feeding mechanism 2 such as a robotic mechanism in step S1, and when it is detected that the blank is placed or set, the conveying mechanism 5 starts operating in step S2, and the conveying mechanism 5 conveys the blank from the feeding position P0 to the energizing position P1 in step S3, and the conveying mechanism 5 releases the holding of the blank and the conduction heating mechanism 3 clamps the blank in step S4. The conduction heating mechanism 3 performs conduction heating onto the blank in a conveyance-stopped state in step S5, and when it is detected that the temperature of the blank reaches a predetermined temperature by the temperature sensor (refer to FIG. 2) provided in the conduction heating mechanism 3 in step S6, the conduction heating mechanism 3 stops energizing in step S7, and the conduction heating mechanism 3 releases the clamping of the blank in step S8. When it is confirmed that the conduction heating mechanism

3 or the conduction heating apparatus returned to the initial position in step S9, the conveying mechanism 5 holds to convey the conduction heated blank from the energizing position P1 to the processing position P2 in step S10, and in the processing position P2 the cooling die 41 of the hot press mechanism 4 performs hot press forming to rapidly-cool the blank, i.e., die quenching onto the blank in step S11. When it is confirmed that the cooling die 41 of the hot press mechanism 4 returned to the initial position in step S12, the conveying mechanism 5 conveys or brings out the formed product from the processing position P2 to the discharging position P3 in step S13.

When the above-described cycle is repeatedly and continuously carried out, the step of conveying a blank from the feeding position P0 to the energizing position P1 in step S3, the step of conveying a conduction heated blank from the energizing position P1 to the processing position P2 in step S10, and the step of conveying a formed product from the processing position P2 to the discharging position P3 in step S13 are synchronously driven to be simultaneously carried out.

The details of steps of conveying, heating, and forming by the hot press forming apparatus according to an example of the present invention described above will be described. (A) to (H) of FIG. 6 are process drawings for explanation of an outline of steps of conveying, heating, and forming by the hot press forming apparatus according to an example of the present invention.

Referring to (A) and (A') of FIG. 6, the pair of parallel arms 51 is located on the lower side and separated from each other at the initial position of the conveying mechanism 5.

Referring to (A) and (B) of FIG. 6, the pair of parallel arms 51 is driven to come close in the width direction by the cylinders 52c, and the plurality of clamps (holding members) 53a to 53c respectively clamp a new blank W0 at the feeding position P0, a conduction heated blank W1 at the energizing position P1, and a formed product W2 die-quenched at the processing position P2. Note that the plurality of clamps 53a to 53c may be holding mechanisms equipped with driving mechanisms in themselves, or may be holding members driven by others.

Referring to (B) and (C) of FIG. 6, the pair of parallel arms 51 is driven to lift up by the cylinders 52b.

Referring to (C) and (D) of FIG. 6, the pair of parallel arms 51 is driven to move to the downstream side in the conveying direction by the cylinders 52a, and the plurality of clamps 53a to 53c respectively move to the energizing position P1, the processing position P2, and the discharging position P3.

Referring to (D) and (E) of FIG. 6, the pair of parallel arms 51 is driven to lift down by the cylinders 52b.

Referring to (E) and (F) of FIG. 6, the pair of parallel arms 51 is driven to be separated away in the width direction by the cylinders 52c, and the plurality of clamps 53a to 53c respectively unclamp the new blank W0 at the energizing position P1, the conduction heated blank W1 at the processing position P2, and the die-quenched formed product W2 at the discharging position P3.

Referring to (F) and (G) of FIG. 6, the pair of parallel arms 51 is driven to lift up by the cylinders 52b. Referring to (G) and (H) of FIG. 6, the pair of parallel arms 51 is driven to return to the upstream side in the conveying direction by the cylinders 52a, and the plurality of clamps 53a to 53c respectively return to the feeding position P0, the energizing position P1, and the processing position P2. During these steps, a new blank W00 is fed at the feeding position P0, the blank W0 is subjected to conduction heating at the energizing position P1, the blank W1 is subjected to hot pressing at the processing position P2, and the formed product W2 is taken out from the discharging position P3 so as to be synchronized with each other.

INDUSTRIAL APPLICABILITY

The hot press forming apparatus and the hot press forming method according to the present invention are applied to forming or manufacturing of a plate material made of metal, in particular, to die quenching. In detail, the hot press forming apparatus and the hot press forming method according to the present invention are suitably applied to forming or manufacturing of vehicle parts requiring mass productivity, for example, forming or manufacturing of various types of reinforcing members for vehicle bodies, in particular, door beams, bumper reinforcements, and the like.

The modifications and adjustments of the embodiment and example are possible within the scope of all the disclosures (including the claims) of the present invention, and further on the basis of the basic technical concept. Further, a wide variety of combinations and selections of various disclosed elements are possible within the scope of claims of the present invention.

EXPLANATION OF SIGNS

1 Hot press forming apparatus
1a Housing
2 Feeding mechanism
3 Conduction heating mechanism
4 Hot press mechanism
5 Conveying mechanism (Transfer mechanism)
5a Specific (or central) Part of Conveying mechanism
6 Control mechanism
7 Conveying conveyor
31 A plurality of electrodes
32 Electrode lifting up/down cylinder
33 Movable clamping cylinder
34 Translatory guide
35 Support bar
41 Die, Cooling die
51 A pair of parallel arms
52a to 52c Cylinders (driving means)
53a to 53c Clamps (holding means)
51 Support bar
P0 Feeding position
P1 Energizing position
P2 Processing position
P3 Discharge position
W0, W00, W1 Blanks
W2 Formed product

The invention claimed is:

1. A hot press forming apparatus that hot press-forms a blank into a formed product, the apparatus comprising:
a conduction heating mechanism which is installed in a housing of the hot press forming apparatus and clamps a fed blank at a predetermined energizing position in a conveyance-stopped state and performs conduction heating onto the blank;
a die quenching hot press mechanism which is installed in the housing of the hot press forming apparatus and disposed so as to be thermally isolated downstream of the conduction heating mechanism, wherein the hot press mechanism hot presses the conduction heated blank at a predetermined processing position; and
a conveying mechanism arranged at least from the energizing position to the processing position which is installed in the housing of the hot press forming apparatus, wherein the conveying mechanism conveys the conduction heated blank at least from the energizing position to the processing position to supply the blank to the hot press mechanism, wherein the conveying mechanism comprises:
a pair of parallel arms extending along a conveying direction of the blank,
a driving mechanism that drives the pair of parallel arms to move in a reciprocating manner along the conveying direction, a lifting up/down direction perpendicular to the conveying direction, and a width direction perpendicular to the conveying and lifting up/down directions; and
a plurality of holding members which are attached to the pair of parallel arms at predetermined intervals along the conveying direction, the plurality of holding members hold the blank and/or the formed product when the pair of parallel arms approaches each other along the width direction, and release the holding when the pair of parallel arms is separated from each other.

2. The hot press forming apparatus according to claim 1, further comprising a control mechanism that executes a cycle of successive steps including: a heating step by the conduction heating mechanism, a processing step by the hot press mechanism, and a conveying step by the conveying mechanism in accordance with a predetermined sequence.

3. The hot press forming apparatus according to claim 2, wherein the control mechanism executes at least the heating step by the conduction heating mechanism and the processing step by the hot press mechanism in synchronization with each other.

4. The hot press forming apparatus according to claim 1, wherein the conveying mechanism has a holding mechanism that is capable of holding the blank synchronously at least at the energizing position and the processing position.

5. The hot press forming apparatus according to claim 4, wherein the holding mechanism is capable of;
holding the blank synchronously at a feeding position at which the blank is fed to the hot press forming apparatus or the conduction heating mechanism, and
holding the formed product at a discharging position at which the formed product is discharged from the hot press forming apparatus.

6. The hot press forming apparatus according to claim 5, wherein the holding mechanism has a plurality of holding members that respectively reciprocate between the energizing position and the processing position, between the feeding position and the energizing position, and/or between the processing position and the discharging position in synchronization with each other, to hold the blank and/or the formed product and release the holding.

7. The hot press forming apparatus according to claim 1, wherein the hot press mechanism comprises a cooling die for hot pressing and rapid quenching of the blank.

8. The hot press forming apparatus according to claim 1, wherein the conduction heating mechanism heats the blank to a temperature for hot pressing by the hot press mechanism.

9. The hot press forming apparatus according to claim 8, comprising:
a temperature sensor in the conduction heating mechanism for detecting the temperature of the blank.

* * * * *